US006658269B1

(12) United States Patent
Golemon et al.

(10) Patent No.: US 6,658,269 B1
(45) Date of Patent: Dec. 2, 2003

(54) WIRELESS COMMUNICATIONS SYSTEM

(75) Inventors: William P. Golemon, Plano, TX (US); Ronald L. Meyer, Parker, TX (US); Ramaiah Velidi, Plano, TX (US)

(73) Assignee: Raytheon Company, Lexington, MA (US)

( * ) Notice: Subject to any disclaimer, the term of this patent is extended or adjusted under 35 U.S.C. 154(b) by 378 days.

(21) Appl. No.: 09/640,837

(22) Filed: Aug. 16, 2000

Related U.S. Application Data

(60) Provisional application No. 60/157,290, filed on Oct. 1, 1999.

(51) Int. Cl.[7] .................................................. H04B 1/38
(52) U.S. Cl. ..................... 455/562; 455/561; 455/7; 455/101; 375/267; 375/141; 370/315
(58) Field of Search .......................... 455/562, 561, 455/101, 7; 375/267, 141, 214; 342/372; 370/315

(56) References Cited

U.S. PATENT DOCUMENTS

| | | | |
|---|---|---|---|
| 4,747,160 A | 5/1988 | Bossard | 455/33 |
| 4,896,371 A | 1/1990 | Kahn | 455/105 |
| 4,931,802 A | 6/1990 | Assal et al. | 342/356 |
| 4,965,605 A | 10/1990 | Chang et al. | 343/700 |
| 5,014,067 A | 5/1991 | Chisholm | 342/407 |
| 5,081,463 A | 1/1992 | Hariu et al. | 342/372 |
| 5,203,018 A | 4/1993 | Hirose | 455/61 |
| 5,276,907 A | 1/1994 | Meidn | 455/33.3 |
| 5,319,677 A | 6/1994 | Kim | 375/100 |
| 5,432,780 A | 7/1995 | Smith et al. | 370/37 |
| 5,457,811 A | * 10/1995 | Lemson | 455/67.1 |
| 5,488,737 A | 1/1996 | Harbin et al. | 455/33.1 |
| 5,542,107 A | 7/1996 | Kay | 455/33.1 |
| 5,548,813 A | 8/1996 | Charas et al. | 455/33.3 |
| 5,563,610 A | 10/1996 | Reudink | 342/375 |
| 5,574,989 A | 11/1996 | Watson et al. | 455/101 |
| 5,576,717 A | * 11/1996 | Searle et al. | 342/373 |
| 5,596,333 A | 1/1997 | Bruckert | 342/457 |
| 5,648,968 A | 7/1997 | Reudink | 370/335 |
| 5,722,063 A | * 2/1998 | Peterzell et al. | 455/287 |

(List continued on next page.)

FOREIGN PATENT DOCUMENTS

| | | | |
|---|---|---|---|
| EP | 0 624 919 A1 | 11/1994 | H01Q/25/00 |
| EP | 0 668 627 A1 | 8/1995 | H01Q/25/00 |
| EP | 0 777 400 A2 | 6/1997 | H04Q/7/36 |
| EP | 0 837 523 A2 | 4/1998 | H01Q/3/26 |
| GB | 2 290 006 A | 12/1995 | H04B/7/005 |
| GB | 2 301 712 A | 12/1996 | H01Q/19/100 |
| WO | WO 95/22210 | 8/1995 | H04B/7/26 |
| WO | WO 95/26616 | 9/1995 | H04Q/7/36 |
| WO | WO 97/11508 | 3/1997 | H01Q/25/00 |

OTHER PUBLICATIONS

Yamada, et al., "Base Station/Vehicular Antenna Design Techniques Employed in High–Capacity Land Mobile Communications System", Electrical Communications Laboratories, vol. 35 No. 2, 1987, pp. 115–121.

Primary Examiner—Nay Maung
Assistant Examiner—Alan Gantt
(74) Attorney, Agent, or Firm—Baker Botts L.L.P.

(57) ABSTRACT

The present invention relates to a transmit diversity antenna system employing active antenna electronics (with both receive and transmit amplifiers distributed among the elements of the antenna), polarization diversity on receive, and polarity diversity along with time delay diversity on transmit. The combination of these three techniques, in wireless communications applications, improves the efficiency and performance of both the transmitted and received signals at a base station, as well as the received signal at the mobile. In practice the present invention enables a substantially "balanced link" to exist between the base station and a mobile.

17 Claims, 2 Drawing Sheets

U.S. PATENT DOCUMENTS

| | | | |
|---|---|---|---|
| 5,812,935 A | 9/1998 | Kay | 455/56.1 |
| 5,920,813 A | 7/1999 | Evans et al. | 455/422 |
| 5,936,577 A | 8/1999 | Shoki et al. | 342/373 |
| 5,940,029 A | 8/1999 | Ninomiya et al. | 342/372 |
| 5,940,445 A * | 8/1999 | Kamin, Jr. | 375/267 |
| 6,038,459 A | 3/2000 | Searl et al. | 455/562 |
| 6,070,090 A | 5/2000 | Feuerstein | 455/561 |
| 6,125,109 A * | 9/2000 | Fuerter | 370/315 |
| 6,236,866 B1 * | 5/2001 | Meyer et al. | 455/562 |
| 6,304,214 B1 * | 10/2001 | Aiken et al. | 342/362 |
| 6,374,083 B1 * | 4/2002 | Ketonen | 455/67.1 |
| 6,377,612 B1 * | 4/2002 | Baker | 375/141 |

* cited by examiner

WIRELESS COMMUNICATIONS SYSTEM

RELATED APPLICATION

This application claims the benefit of U.S. Provisional Application Ser. No. 60/157,290, filed Oct. 1, 1999.

TECHNICAL FIELD OF THE INVENTION

This invention relates to a wireless communications system with receive polarity diversity and integrated, time delayed, transmit polarity diversity, and more particularly to a wireless communications system having improved "reverse link" and "forward link" performance enabling extended range and substantially "balance links".

BACKGROUND OF THE INVENTION

Wireless communication systems generally include a base station for receiving and transmitting electromagnetic radiations and mobile stations disposed within the coverage area of the base station. The mobile stations transmit electromagnetic radiations to and receive such radiations from the base station, where several such base stations are generally linked together through base station controllers (BSC) and mobile switching centers (MSC) to provide a seamless communication link between a mobile station and a calling or called party.

Wireless communications are typically embodied within two bands. Those systems between approximately 850 and 950 MHz are referred to as cellular and those systems between approximately 1.8 and 2.0 GHz are referred to as personal communications systems (PCS). This invention relates to both cellular and PCS systems.

The coverage area, or range of base stations are generally limited by the receive noise figure (NF) of the base station and by the radiated power of the mobile station on the uplink and by the BSC; transmit effective isotropic radiated power (EIRP) and the NF of the base station on the down link. Presently, base station architecture utilizes an antenna array comprising a plurality of spaced apart radiating elements for transmission and a separate such plurality of radiating elements for reception.

The radiating elements are generally electrically conductive members disposed on a support and are generally spaced between three-fourths and one wavelength apart. The antenna elements are generally connected to a combiner via short transmission lines.

To improve base station performance, the receive antenna configuration generally comprises two columns to provide spatial diversity or a single orthogonally polarized column having two orthogonal polarization outputs to provide polarization diversity.

The transmit antenna elements are generally disposed on a support, and the distance between the transmit or send antenna elements is typically quite large, often a few meters.

In a wireless communications system, the signal path from a base station to the mobile stations is referred to as the "forward link", while the signal path from the mobile station to the base station is the "reverse link". Wireless communication systems are limited by the capability of the mobile stations to receive information in the presence of interference. A key performance measure is the minimum ratio of signal power to interference power that permits acceptable communication quality.

A "balanced link" is defined as the condition where the mobile station receives the minimum acceptable signal power from the base station (forward link) at essentially the same distance as the base station receives the minimum acceptable signal power from the mobile station (reverse link). Tower mounted amplifiers typically improve signal strength on both the forward and reverse links, but the improvement is not necessarily symmetrical. Regulatory limitations on transmitted power often mean that more performance improvement is available on the reverse link than the forward link.

Cellular and PCS systems rely extensively on reflected or "multipath" energy to maintain the communication link. These paths constantly change as the mobile station and/or objects in the immediate vicinity of the mobile station move. The result of this propagation environment is that various reflected signals combine, both constructively and destructively over time, to form a net received signal with wide fluctuations in strength (i.e. Rayleigh fading) at any point in the coverage area. As the signal strength from the base station decreases, due to either increased distance from the base station or signal absorption as the user moves deeper into buildings, the mobile station receiving this signal may experience random outages causing severe degradation in performance or loss of communication.

Mobile phone standards include a variety of equalization, data interleaving, and encoding techniques to compensate for signal fading. These are helpful but not sufficient to completely solve the problem. The power transmitted by the base station can usually be slightly increased through several approaches. A large power amplifier can be used to help overcome feeder losses, or tower mounted amplifiers or phased array antenna implementations (incorporating distributed amplifiers behind the elements) can boost the output power. However, the FCC places an upper limit on effective isotropic radiated power (EIRP). Even when the maximum legal power is achieved, current low noise amplifier (LNA) technology is such that the received signal-to-noise ratio at the base station is still better than that available at the mobile.

The forward link signal fading can be mitigated by dividing the signal between two or more antennas that are spatially separated and/or orthogonally polarized, so that multiple, uncorrelated signals reach the mobile receiver, as is done on the reverse link. However, if these signals are subsequently re-combined non-coherently at the receiver, a net loss in received signal strength is realized instead of a gain. All of the multiple transmission techniques used to date have employed some combination of alternating transmissions, pilot signals, additional channel coding, or multiple time slots as a means of maintaining separation of the two received signals within a single mobile receiver so that they can be coherently summed to provide signal gain. An intentional time delay can also be introduced between two signals transmitted to the mobile to introduce some inter-symbol interference (ISI) in the received signal at the mobile. This ISI enables an improvement in performance for receivers equipped with equalizer structure (found in nearly all mobile stations) because equalizers coherently combine two signals arriving through uncorrelated paths, yielding an improvement in performance. The delay is typically accomplished in the base station by dividing the baseband signal, introducing the delay in one path, and then utilizing two transmitters with redundant coaxial feeders.

SUMMARY OF THE INVENTION

In accordance with the present invention, a tower mounted antenna system for a wireless communication system has improved forward link performance that substantially improves or matches the reverse link performance thereby resulting in a balanced link at a greater distance from the base station than heretofore achievable. Improved performance is achieved through the integration of a diversity technique that improves the signal received at the mobile with diversity techniques that improve the signal received at the base station to "balance" the RF link at a greater distance than possible using presently known techniques.

Polarity and time delay diversity schemes have been individually utilized in previous systems. There are also systems that include the fusion of polarity and time delay diversity techniques on transmit to provide an improvement in forward link performance that is greater than the sum of the techniques taken individually. This combination allows the exploitation of under-utilized RF channel compensation structures present in existing mobile receivers. Both Time Division Multiple Access (TDMA) and Code Division Multiple Access (CDMA) systems experience improvement since each standard utilizes a channel compensation technique (e.g. equalizers in TDMA and rake receivers in CDMA). Transmit delay diversity, as conventionally implemented, only extracts a small additional signal gain from the equalizer or rake receiver of the mobile receiver by introducing some inter-symbol interference (ISI). However, the delay that maximizes the gain from the equalizer or rake receiver (a time measured in microseconds) is much too short to provide any immunity from fast signal Rayleigh fading (time in milliseconds).

The present invention is an antenna system that provides multiple signal diversity in a unitary package and combines a time delayed version of the transmit signal with an orthogonal polarized antenna to provide a second uncorrelated, delayed signal that is coherently added by the channel compensation techniques of the mobile unit, simultaneously adding ISI and combating fast signal fading. Improved performance is experienced at the mobile, but effected from the base station antenna system. Furthermore, this particular implementation combines receive polarization, transmit and delay diversities with active antenna architectures to enable the maximum limit of RF power to be employed while simultaneously providing a balanced link at either a greater distance from the base station or deeper into buildings than is currently possible with the same base station locations. The improved system performance increases data transmission rates, or improves resource utilization (e.g. by reducing CDMA soft handoff requirements).

In accordance with the present invention, there is provided a communication system having a base station tower transmitting and receiving RF signals from at least one mobile station. The communication system comprises:

a first receive antenna (array) of a first polarization supported on the base station tower;

a second receive antenna (array) of a second polarization diverse to the first polarization supported on the base station tower;

a first transmit antenna (array) of a first polarization supported on the base station tower;

a second transmit antenna (array) of a second polarization diverse to the first polarization supported on the base station tower;

a first RF power amplifier(s) close coupled to the first transmit antenna on the tower;

a second RF power amplifier(s) close coupled to the second transmit antenna on the tower;

a first low noise amplifier(s) close coupled to the first receive antenna on the tower;

a second low noise amplifier(s) close coupled to the second receive antenna on the tower; and an RF delay network close coupled to the second power amplifier(s) on the tower to generate primary and delayed orthogonal versions of a transmit signal from the first and second transmit antenna(s)(arrays).

BRIEF DESCRIPTION OF THE DRAWINGS

The present invention will be understood by one of ordinary skill in the art from the following written description, taken in conjunction with the drawings, wherein.

DETAILED DESCRIPTION OF THE INVENTION

The present invention relates to a transmit diversity antenna system employing active antenna electronics (with both receive and transmit amplifiers distributed among the elements of the antenna), polarization diversity on receive, and polarity diversity combined with time delay diversity on transmit. The combination of these three techniques, in wireless communications applications, improves the efficiency and performance of both the transmitted and received signals at a base station, as well as the received signal at the mobile. In practice the present invention enables a "balanced link" to exist between the base station and a mobile.

Each mobile phone's internal digital signal processing functionality is mandated by the appropriate standards body depending on the application, (i.e. TDMA IS-136, GSM, or CDMA2000, WB-CDMA etc.), to include some type of RF multi-path channel compensation. This compensation takes the form of RF channel equalization in TDMA systems, or as a multi-correlator, sometimes referred to as rake receiver, in CDMA systems. Both of these processing techniques provide some capability to help the receiver overcome impairments to the received signal caused by the wireless RF channel. Consequently, if RF conditions are purposely set up to simulate normal channel conditions, when such conditions are not naturally occurring, the available performance improvement through invocation of the equalization/compensation would be realized.

In accordance with the present invention, the decorrelated signal is delayed such that it falls within the equalizer window of a TDMA system to be accepted and coherently combined with the original signal to improve the received signal-to-noise ratio. Similarly, by selective adjustment, the decorrelated signal is delayed to fall within an integer multiple of 1-chip delays for a CDMA system so that one or more multiple correlators (rake fingers) are provided with additional signal, thereby improving the received signal-tonoise ratio. When a system in accordance with the present invention is employed, improved mobile performance is available to be utilized in several different ways; poor quality signals are made useable for communication, or higher information rates can be employed with communication links that are functional but limited in data rate capability due to the signal-to-noise ratio realized with conventional systems.

Figure 1:
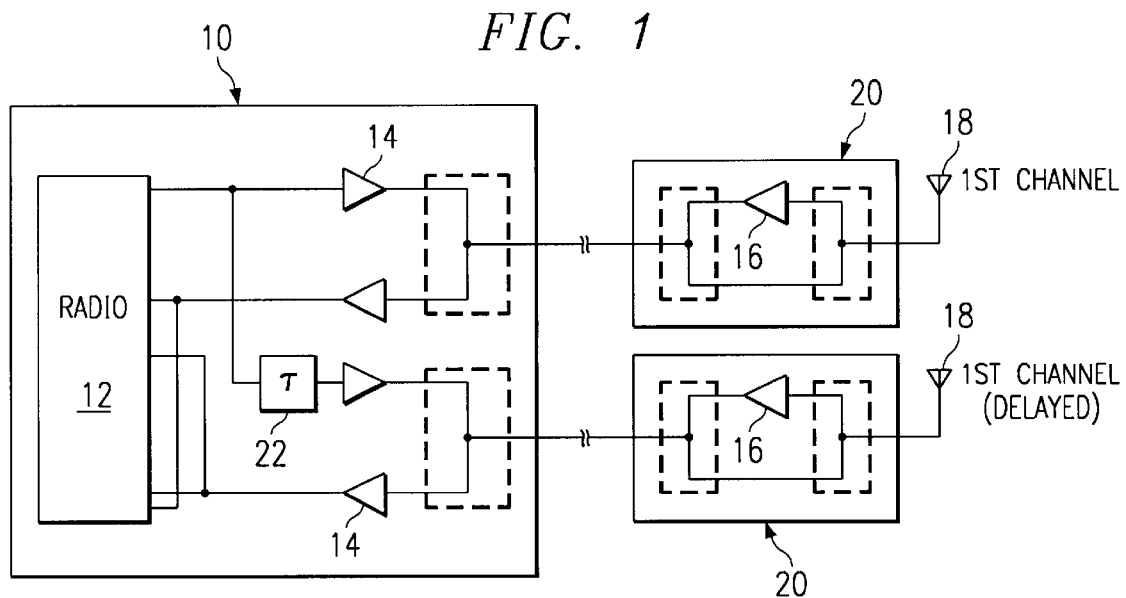
FIG. 1 is a schematic block diagram illustrating the basic components of a wireless communication system having conventional time delay diversity on transmit.

Referring to FIG. 1, a conventional mobile radio base station 10 consist of three parts: a radio unit 12 that connects to a power amplifier 14; an external low noise amplifier 16; and a passive antenna 18. The radio unit 12 is usually housed at ground level. From the ground level radio unit 12, the output signal is amplified and transmitted up a tower 20 to the antenna 18 for transmission to mobile receivers. A received signal from mobile receivers passes from the antenna 18, through the low noise amplifier 16, generally mounted on the top of the tower 20 relatively close to the antenna 18, and then down to the receive section of the base station 10.

The conventional base station 10 has been modified as shown in FIG. 1 to incorporate delay diversity. Note that the delay element is implemented at baseband in the base station 10 thereby necessitating duplication of all RF hardware from the base station output to a second antenna system. The delay element 22 cannot be moved toward the antenna 18 to eliminate redundancy without introducing substantial loss, requiring re-amplification. This requirement for redundancy reduces the channel capacity of the base station.

Figure 2:
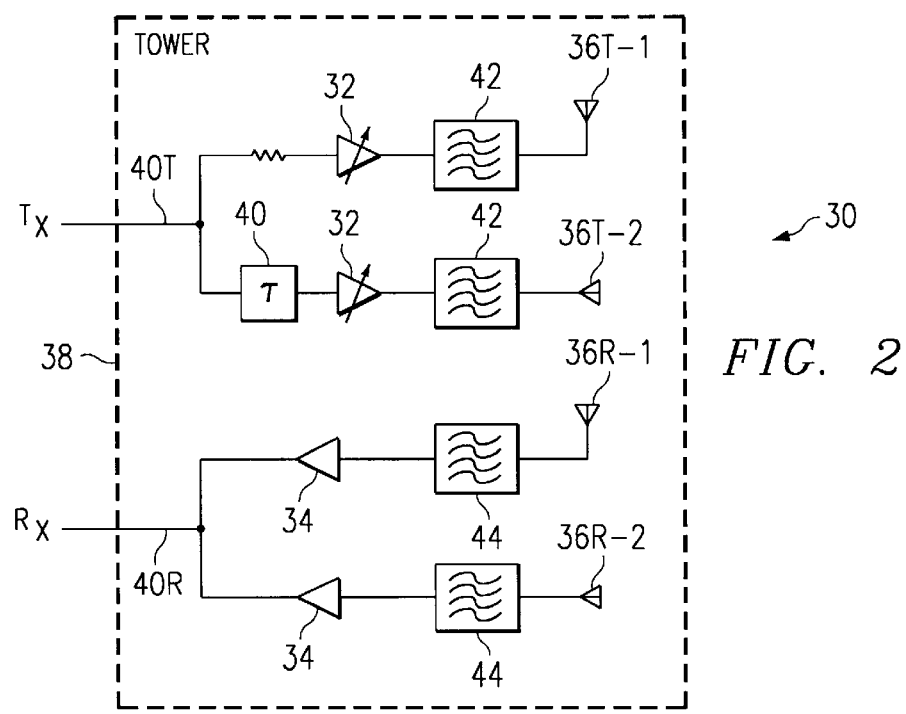
FIG. 2 is a schematic block diagram illustrating the functional components of a wireless communication system having separate tower mounted transmit and receive antennas with polarization diversity on receive and polarization diversity along with time delay diversity on transmit.

Referring to FIG. 2, there is shown an active antenna system 30 comprising a distributed series of high power, adjustable gain, transmit gain-adjustable amplifiers 32 and distributed low noise receive amplifiers 34 integrated directly behind the antenna elements 36. Relocation of the power amplifier 32 to the tower 38 has several benefits. It effectively removes from consideration the losses associated with feeder cables 40, since only a small drive signal is required for the amplifiers 32. This in turn allows the utilization of lower cost, lighter weight feeder cables without compromising the amount of power radiated. Other, secondary benefits include the increased reliability of multiple, lower power amplifiers, an increase in dc to RF efficiency, reduced tower wind and weight loading, and increased life expectancy for the radio unit. Relocation of the receive amplifier 34 as an integral part of the antenna system effectively minimizes internal antenna manifold and external jumper losses, increasing the overall system sensitivity by several dB.

The basic active antenna system as just described with reference to FIG. 2 was originally intended to provide increased power on the forward link combined with an integrated receiver system that would give performance comparable to or better than that of conventional, external, tower mounted low noise amplifiers. However, field testing has shown that increased receiver sensitivity (compared to tower mounted low noise amplifiers) often provides more improvement on the reverse (up) link than on the forward (down) link, resulting in a system that is improved, but still forward link limited.

To further enhance the forward link, and provide a balanced system without exceeding governmental power (FCC in the US) limits on maximum power, a transmit diversity system is provided in accordance with the present invention. The active antenna is modified to transmit two signals instead of one to accomplish this function. A block diagram of such a system is shown in FIG. 2. On the forward link, the active antenna system 30 receives a single, low power signal on feeder cable 40T from the base station (not shown). This signal from the base station is split and then transmitted from the antenna elements 36T-1 and 36T-2 (to the mobile) as two, high power output signals. One part of the split signal from the base station is offset by a time delay (with delay set appropriately to match the wireless protocol standard of choice), introduced into the split path by a delay element 40 ahead of the amplifier 32. Each of the signals from the amplifiers 32 are then passed through filters 42 and radiated through separate arrays of antenna elements 36T-1 and 36T-2. The two arrays of antenna elements 36T-1 and 36T-2 are orthogonally polarized to provide uncorrelated paths to the mobile which, combined with the time delay, enables the equalizer or rake receiver of the mobile to identify the initial and delayed signals, coherently combine these signals, and thus improve the forward link transmission. Implementation of the delay on the tower 38 at RF enables an existing base station to maintain current channel capacity without modification.

Distribution of amplification among the receive and transmit elements minimizes the losses in the high power (transmit) sections of the system and ensures maximum power is delivered to the antenna elements independent of cable feeder losses. Distribution also minimizes the losses in the low signal-to-noise receiver sections of the system, providing maximum sensitivity and minimum noise figure. The combination of maximum EIRP and downlink diversity results in a time delay diversity antenna (TDDA) system providing balanced link sensitivity through the combination of a high performance receiver system operating with forward link diversity transmit. This provides balanced range extension in rural environments and better building penetration in urban environments.

Figure 3:
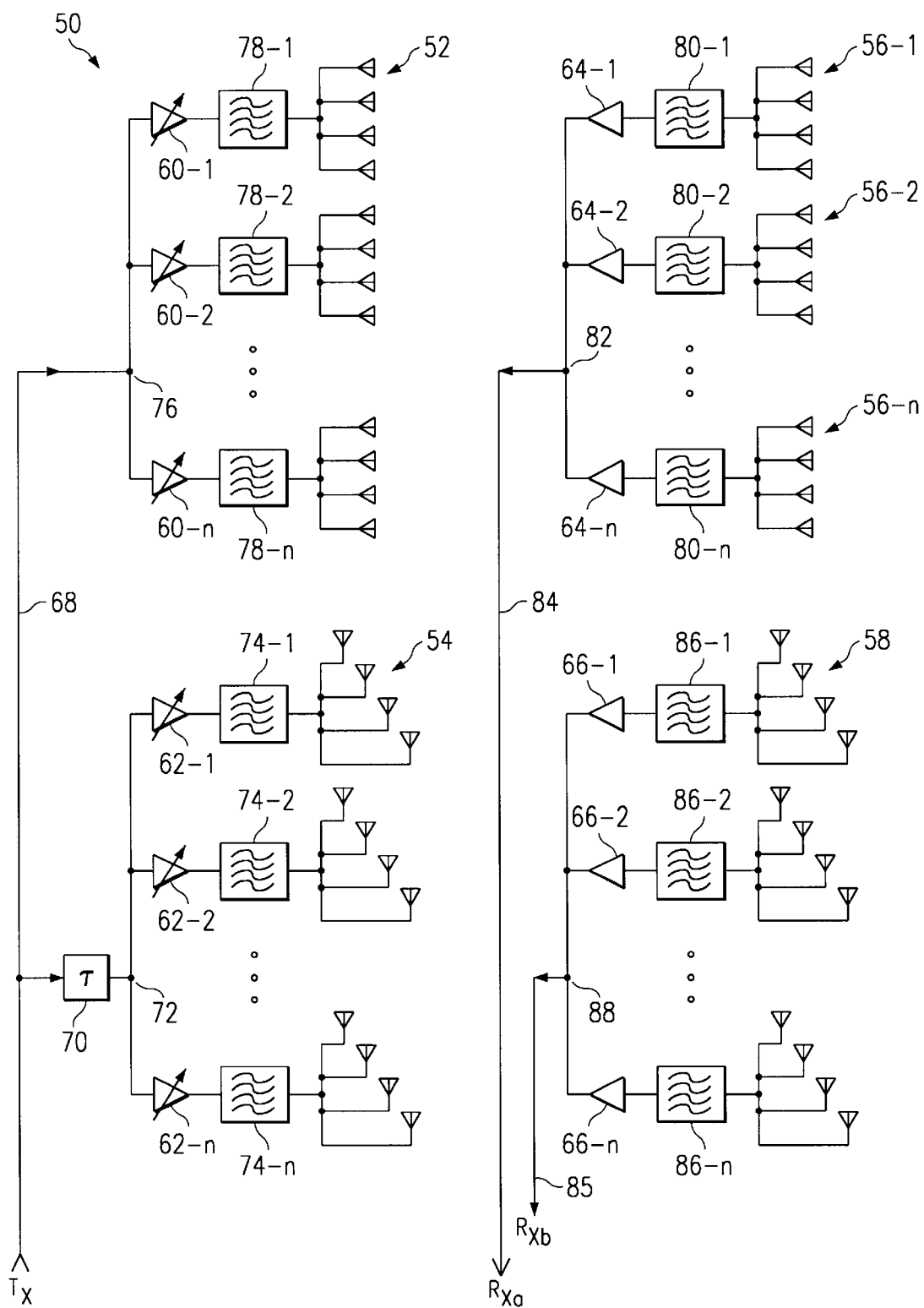
FIG. 3 is a schematic block diagram of a wireless communication system having tower mounted active antenna elements with polarization diversity on receive, and polarization diversity along with time delay diversity on transmit in accordance with the present invention.

Referring to FIG. 3, there is shown a transmit diversity system 50 with enhanced forward link performance to provide a balanced system without exceeding governmental limits on maximum power. Active transmit antenna elements 52 and 54 are orthogonally oriented in a multi-element, multi-column configuration to provide transmit diversity in accordance with the present invention. The arrays of transmit antenna elements 52 and 54 and arrays of receive antenna elements 56 and 58, also in a multi-element, multi-column configuration, are mounted on a conventional tower with distributed transmit and receive electronics integrated with the antenna elements. The electronics integrated with transmit antenna elements 52 and 54 include distributed gain adjustable power amplifiers 60-1 to 60-n and 62-1 to 62-n and the electronics for the dual polarization receive antenna elements 56 and 58 include distributed low noise amplifiers 64-1 to 64-n and 66-1 to 66-n. As described with reference to the transmit antenna elements 52 and 54, the receive antenna elements 56 and 58 are orthogonally supported on the tower to provide receive diversity.

For the forward link, that is, for the transmit antenna elements 52 and 54, the antenna system 50 receives a single, low power signal from a base station (not shown) on a forward link feed cable 68. The signal from the base station is split with one part offset in a time delay network 70 and applied to the gain adjustable amplifiers 62-1 to 62-n through a power divider 72. The output of each of the amplifiers 62-1 to 62-n is applied through a respective filter 74-1 to 74-n to the array of transmit antenna elements 54. The signal from the base station on the forward link feed cable 68 is also applied through a power divider 76 to the gain adjustable amplifiers 60-1 to 60-n each having an output applied through a respective filter element 78-1 to 78-n to the array of transmit antenna elements 52.

The two arrays of antenna elements 52 and 54 are orthogonally polarized to provide uncorrelated paths to a mobile receiver which, combined with the time delay introduced by the time delay network 70, enables the equalizer or rake receiver of the mobile receiver to identify the initial and delayed signals. The initial and delayed signals are coherently combined thereby improving the forward link transmission.

In the receive portion of the antenna system 50 of FIG. 3, signals received from the mobile receiver at the array of antenna elements 56 are combined and applied through filter elements 80-1 to 80-n to input terminals of amplifiers 64-1 to 64-n. The outputs of the amplifiers 64-1 to 64-n are combined in a power combiner 82 and fed to the base station by a down link feed cable 84.

Signals from the mobile receiver are also received by the array of antenna elements 58. Output signals from the array of antenna elements 58 are combined and applied to filter elements 86-1 to 86-n and then to the input of the amplifiers 66-1 to 66-n. The outputs of the amplifiers 66-1 to 66-n are combined in a power combiner 88 connected to the down link feed cable 85.

As illustrated and described in U.S. patent application Ser. No. 09/298,713, filed May 15, 1998 a variation of the architecture of FIG. 3 includes a variable phase shifter and a variable antenuator placed in series with each combination of amplifier and filter of FIG. 3. By varying the phase and amplitude, there is provided the ability to electronically tilt and shape the beam in elevation, depending upon the traffic patterns and the topography of the cell being served. This elevation beam shaping is dynamically controlled from the base station.

Distribution of amplification among the receive and transmit antenna elements of the antenna system 50 minimizes the losses in the high power (transmit) sections of the system and insures maximum power is delivered independent of antenna location or feeder losses. Distribution also minimizes the loses in the low signal-to-noise receiver sections of the system, thereby providing maximum sensitivity and minimum noise figure.

The combination of maximum EIRP and down link diversity allows the antenna system 50 to balance the reverse link sensitivity of a high performance receiver system operating with a forward link diversity transmit system Although the invention has been described with respect to specific preferred embodiments, many variations and modifications will become apparent to those skilled in the art. It is therefore intended that the appended claims be interpreted as broadly as possible in view of the prior art to include all such variations and modifications.

What is claimed is:

1. A communications system having a base station tower transmitting RF signals to and receiving RF signals from at least one mobile station, comprising:

a first receive antenna of a first polarization supported on the base station tower;

a second receive antenna of a second polarization diverse to the first polarization supported on the base station tower;

a first transmit antenna of a first polarization supported on the base station tower;

a second transmit antenna of a second polarization diverse to the first polarization supported on the base station tower;

a first RF power amplifier mounted on the base station tower and close coupled to the first transmit antenna, the close coupling of the first RF power amplifier to the first transmit antenna increasing transmission power of the first transmit antenna;

a second RF power amplifier mounted on the base station tower and close coupled to the second transmit antenna, the close coupling of the second RF power amplifier to the first transmit antenna increasing transmission power of the second transmit antenna;

a first low noise amplifier mounted on the base station tower and close coupled to the first receive antenna, the close coupling of the first low noise amplifier to the first receive antenna increasing receiver sensitivity of the first receive antenna;

a second low noise amplifier mounted on the base station tower and close coupled to the first receive antenna, the close coupling of the second low noise amplifier to the second receive antenna increasing receiver sensitivity of the second receive antenna; and an RF delay network mounted on the base station tower and close coupled to the second RF power amplifier to generate a delayed version of a transmit signal to thereby generate first and second polarization signals from the first and second transmit antennas.

2. The communications system as set forth in claim 1 wherein the first and second RF power amplifiers comprise a gain adjustment to maximize allowable transmission power to the at least one mobile station.

3. The communications system as set forth in claim 1 further comprising a first transmit filter connected to the first RF power amplifier, and a second transmit filter connected to the RF second power amplifier.

4. The communications system as set forth in claim 1 further comprising a first receive filter connected to the first low power noise amplifier, and a second receive filter connected to the second low noise amplifier.

5. The communications system as set forth in claim 1 wherein the first and second receive antenna and the first and second transmit antenna each comprise a plurality of elements in an antenna array; and wherein the first and second RF power amplifiers and the first and second low noise amplifiers each comprise a plurality of amplifiers.

6. A communications system having a base station transmitting RF signals to and receiving RF signals from at least one mobile station, comprising:

a first plurality of transmit antenna elements of a first polarization supported on the base station;

a second plurality of transmit antenna elements of a second polarization diverse to the polarization of the first plurality of antenna elements supported on the base station;

a first plurality of receive antenna elements having a first polarization supported on the base station;

a second plurality of receive antenna elements of a second polarization diverse to the polarization of the first plurality of receive antenna elements supported on the base station;

a plurality of distributed RF power amplifiers mounted on the base station and selectively close coupled to the plurality of first transmit antenna elements and the plurality of second transmit antenna elements, the selective close coupling of the plurality of distributed RF power amplifiers to the plurality of first transmit antenna elements and the plurality of second transmit antenna elements increasing transmission power of the plurality of first transmit antenna elements and the plurality of second transmit antenna elements;

a plurality of distributed low noise amplifiers mounted on the base station and selectively close coupled to the first plurality of receive antenna elements and the second plurality of receive antenna elements, the selective close coupling of the plurality of distributed low noise amplifiers to the first plurality of receive antenna elements and the second plurality of receive antenna elements increasing receiver sensitivity of the first plurality of receive antenna elements and the second plurality of receive antenna elements; and an RF delay network mounted on the base station and close coupled to the first plurality of transmit elements to generate a delayed version of the transmit signal to thereby generate first and second polarization signals from the first and second plurality of transmit antenna elements.

7. The communications system as set forth in claim 6 wherein the number of distributed RF power amplifiers equals the plurality of first transmit antenna elements plus the plurality of the second transmit antenna elements, a first subset of the distributed RF power amplifiers connected to said plurality of first transmit antenna elements and a second subset of the distributed RF power amplifiers connected to the plurality of second transmit antenna elements.

8. The communications system of claim 6 wherein the number of distributed low noise amplifiers equals the first plurality of receive antenna elements plus the second plurality of receive antenna elements, a first subset of the low noise amplifiers connected to said first plurality of receive antenna elements and a second subset of the low noise amplifiers connected to said second plurality of receive antenna elements.

9. The communications system of claim 6 wherein each of the plurality of distributed RF power amplifiers comprises a gain adjustment to maximize allowable transmission power to the at least one mobile station.

10. The personal communications system as set forth in claim 6 further comprising a plurality of transmit filters individually connected in a one-on-one configuration to said plurality of RF power amplifiers.

11. The personal communications system as set forth in claim 6 further comprising a plurality of receive filters individually connected in a one-on-one configuration to said plurality of low noise amplifiers.

12. A communications system having a base station transmitting RF signals to and receiving RF signals from at least one mobile station, comprising:

a multi-element, multi-column receive antenna, said receive antenna comprises a first plurality of receive antenna elements of a first polarization, and a second plurality of receive antenna elements having a polarization diverse to the polarization of the first plurality of receive antenna elements;

a multi-element, multi-column transmit antenna, said transmit antenna comprises a first plurality of transmit antenna elements having a first polarization, and a second plurality of transmit antenna elements having a second polarization diverse to the polarization of the first plurality of transmit antenna elements;

a plurality of distributed RF power amplifiers selectively close coupled to the first plurality of transmit antenna elements and to the second plurality of transmit antenna elements;

a plurality of distributed low noise amplifiers selectively close coupled to the first plurality of receive antenna elements and to the second plurality of receive antenna elements; and an RF delay network coupled to the first plurality of transmit antenna elements to generate a delayed version of the transmit signal to thereby generate first and second polarization signals from the first and second plurality of transmit antenna elements.

13. The communications system as set forth in claim 12 wherein the number of distributed RF power amplifiers equals the plurality of first transmit antenna elements plus the plurality of the second transmit antenna elements, a first subset of the distributed RF power amplifiers individually connected in a one-on-one configuration to said plurality of first transmit antenna elements and a second subset of the distributed RF power amplifiers connected to the plurality of second transmit antenna elements.

14. The communications system of claim 13 wherein the number of distributed low noise amplifiers equals the first plurality of receive antenna elements plus the second plurality of receive antenna elements, a first subset of the low noise amplifiers individually connected in a one-on-one configuration to said first plurality of receive antenna elements and a second subset of the low noise amplifiers connected to said second plurality of receive antenna elements.

15. The communications system of claim 12 wherein each of the plurality of distributed RF power amplifiers comprises a gain adjustment to maximize allowable transmission power to the at least one mobile station.

16. The communications system as set forth in claim 12 further comprising a plurality of transmit filters individually connected in a one-on-one configuration to said plurality of power amplifiers.

17. The communications system as set forth in claim 12 further comprising a plurality of receive filters individually connected in a one-on-one configuration to said plurality of low noise amplifiers.

* * * * *

UNITED STATES PATENT AND TRADEMARK OFFICE
CERTIFICATE OF CORRECTION

PATENT NO. : 6,658,269 B1
DATED : December 2, 2003
INVENTOR(S) : William P. Golemon et al.

It is certified that error appears in the above-identified patent and that said Letters Patent is hereby corrected as shown below:

<u>Title page, Item [54] and Column 1, line 1</u>,
Change the Title from "WIRELESS COMMUNICATIONS SYSTEMS" to
-- CLOSELY COUPLING AMPLIFIERS TO ANTENNAS ON A BASE STATION TOWER --.

<u>Column 7</u>,
Line 38, change "the loses in the" to -- the losses in the --; and
Line 44, after "transmit system", insert a period -- . --.

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,658,269 B1
DATED : December 2, 2003
INVENTOR(S) : William P. Golemon et al.

It is certified that error appears in the above-identified patent and that said Letters Patent is hereby corrected as shown below:

Title page, Item [54] and Column 1, line 1,
Change the Title from "WIRELESS COMMUNICATIONS SYSTEM" to
-- CLOSELY COUPLING AMPLIFIERS TO ANTENNAS ON A BASE STATION TOWER --.

Title page,
Item [56], References Cited, U.S. PATENT DOCUMENTS, change the inventor's name for U.S. Patent 5,276,907 from "Meidn" to -- Meidan --.

Column 7,
Line 38, change "the loses in the" to -- the losses in the --; and
Line 44, after "transmit system", insert a period -- . --.

Signed and Sealed this

Seventeenth Day of August, 2004

JON W. DUDAS
*Acting Director of the United States Patent and Trademark Office*